(12) United States Patent
Carra et al.

(10) Patent No.: US 6,415,834 B1
(45) Date of Patent: Jul. 9, 2002

(54) TIRE HAVING LOW ROLLING RESISTANCE, IN PARTICULAR FOR DRIVING WHEELS OF HEAVY VEHICLES

(75) Inventors: Alberto Carra; Luigi Campana, both of Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/352,214

(22) Filed: Jul. 13, 1999

Related U.S. Application Data

(63) Continuation of application No. PCT/EP98/00387, filed on Jan. 16, 1998.

(30) Foreign Application Priority Data

Jan. 20, 1997 (IT) .......................................... MI97A0103

(51) Int. Cl.[7] .......................... B60C 11/11; B60C 11/12; B60C 11/13
(52) U.S. Cl. ............................ 152/209.15; 152/209.18; 152/209.21; 152/209.22; 152/209.27; 152/209.28; 152/DIG. 3
(58) Field of Search ....................... 152/209.18, 209.21, 152/209.22, 209.25, 209.27, DIG. 3, 902, 209.28, 209.15

(56) References Cited

U.S. PATENT DOCUMENTS

| | | | | | |
|---|---|---|---|---|---|
| 3,799,231 A | * | 3/1974 | Boileau | ................. | 152/209.18 |
| 4,057,089 A | * | 11/1977 | Johannsen | ............. | 152/209.18 |
| 4,515,197 A | * | 5/1985 | Motomura et al. | .... | 152/209.22 |
| 4,690,189 A | * | 9/1987 | Bradisse et al. | ....... | 152/209.15 |
| 5,240,053 A | * | 8/1993 | Baumhofer et al. | ... | 152/209.22 |
| 5,309,963 A | * | 5/1994 | Kakumu et al. | ....... | 152/209.18 |
| 5,795,415 A | * | 8/1998 | Campana et al. | ...... | 152/DIG. 3 |
| 5,909,756 A | * | 6/1999 | Miyazaki | ................ | 152/DIG. 3 |
| 5,918,654 A | * | 7/1999 | Bossut | .................. | 152/209.18 |
| 6,138,728 A | * | 10/2000 | Miyazaki | ............... | 152/209.15 |
| 6,142,200 A | * | 11/2000 | Feider et al. | .......... | 152/209.18 |

FOREIGN PATENT DOCUMENTS

| | | | |
|---|---|---|---|
| CA | 2084741 | * | 6/1993 |
| EP | 0 230 765 | | 8/1987 |
| EP | 0 233 135 | | 8/1987 |
| EP | 348335 | * | 12/1989 |
| EP | 0 486 838 | | 5/1992 |
| FR | 2 526 722 | | 11/1983 |
| JP | 63-312204 | * | 12/1988 |
| JP | 1-195103 | * | 8/1989 |
| JP | 7-172112 | | 7/1995 |
| JP | 8-282213 | * | 10/1996 |
| WO | WO 97/46400 | * | 12/1997 |

OTHER PUBLICATIONS

Aoki Namihito, "Pneumatic Tire", Patent Abstracts of Japan—JP 07 172112, Jul. 11, 1995, (Abstract Only).
Numata Kazuoki, "Pneumatic Tire", Patent Abstracts of Japan—JP 05 178031, Jul. 20, 1993, (Abstract Only).

* cited by examiner

Primary Examiner—Steven D. Maki
(74) Attorney, Agent, or Firm—Finnegan, Henderson, Farabow, Garrett & Dunner, LLP

(57) ABSTRACT

A tire (1) having low rolling resistance, in particular for driving wheels of heavy vehicles, comprises a tread (14) provided with a plurality of transversal grooves (20) pitchwise spaced from one another and extending in a direction substantially perpendicular to the rolling direction of the tire (D). The grooves (20) have a reduced depth and are provided with respective slits (24), extending from a bottom portion (21) thereof; as such, they contribute to impart to the tire (1) both the desired low rolling resistance and an adequate traction characteristics during straightaway running.

72 Claims, 4 Drawing Sheets

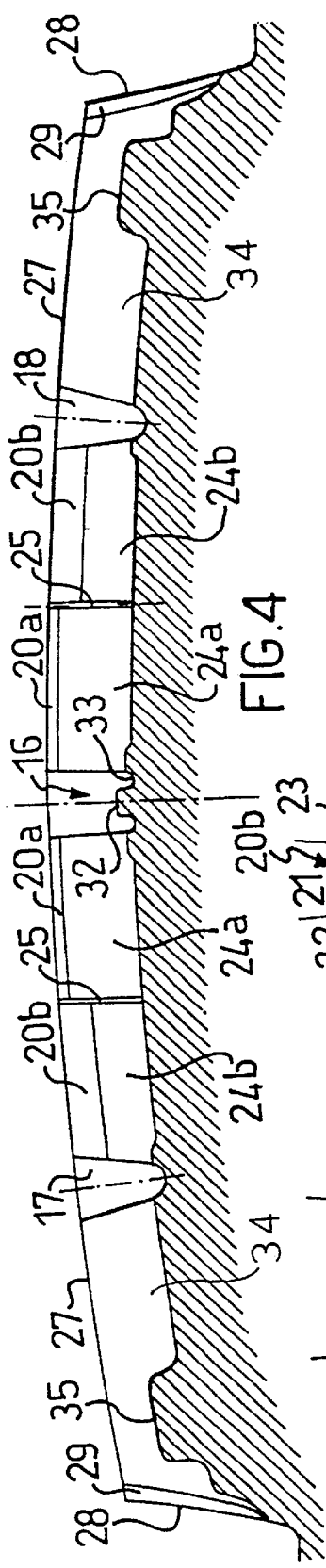
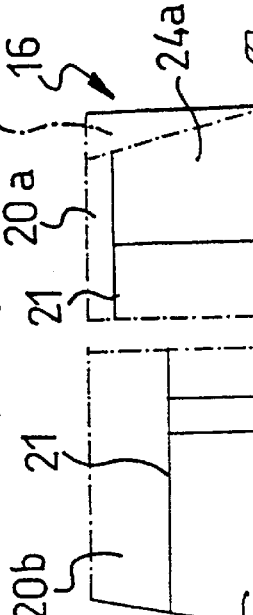
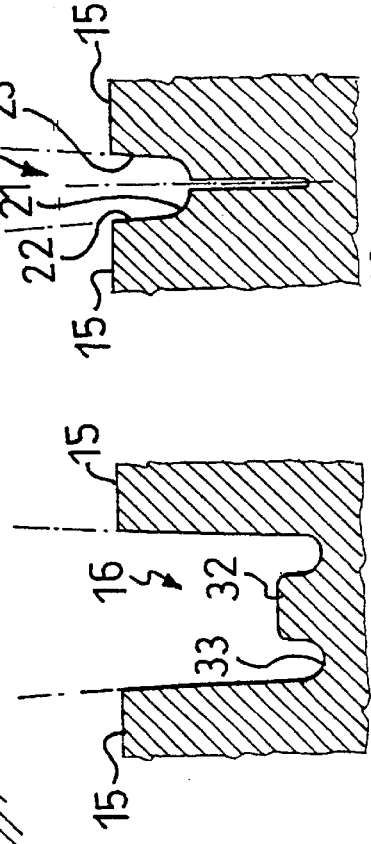
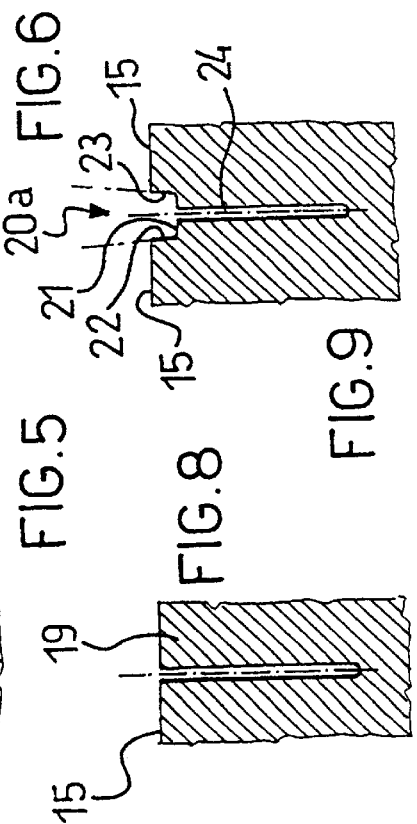
FIG.4 FIG.5 FIG.6 FIG.7 FIG.8 FIG.9 FIG.10

TIRE HAVING LOW ROLLING RESISTANCE, IN PARTICULAR FOR DRIVING WHEELS OF HEAVY VEHICLES

This application is a continuation of International Application No. PCT/EP98/00387, filed Jan. 16, 1998, in the Euopropean Patent Office, the content of which is relied upon and incorporated herein by reference; additionally, Applicants claim the right of priority under 35 U.S.C. §119(a)–(d) based on patent application No. MI97A00103, filed Jan. 20, 1997, in the Italian Patent Office.

DESCRIPTION

In its more general aspect, this invention relates to a tire for vehicles comprising:
  a carcass structure including a central crown portion and two sidewalls ending into a couple of beads for anchoring to a rim of a wheel;
  a belt structure, coaxially associated to the carcass structure;
  a tread, coaxially extending around the belt structure, comprising a plurality of blocks, located on opposite parts of an equatorial plane of the tire between a longitudinal groove formed astride said equatorial plane and a couple of longitudinal grooves, said blocks being circumferentially spaced by a plurality of first slits extending in a direction substantially perpendicular to the rolling direction of the tire.

More particularly, the invention refers to a tire which is preferably, however not exclusively, used on driving wheels of heavy vehicles adapted to cover long travels in motorways.

In the following description and in the appended claims, the term: "block" is used to indicate a tread portion comprised between consecutive grooves or slits either in the axial or in the circumferential direction.

In the following description and in the appended claims, the terms: "grooves" and "slits" are used to indicate channels formed in the tire tread and having a width greater than and, respectively, equal to or smaller than 1 mm.

In the following description and in the appended claims, furthermore, the terms: "longitudinal" and "longitudinally", are used to indicate quantities measured along the circumferential development of the tire.

Lastly, in the following description and in the appended claims, the terms: "axial" and "axially" are intended to indicate quantities measured along the peripheral surface of the tire in a direction perpendicular to the equatorial plane of the same.

As is known, in the field of tire production, intended or not for use on heavy vehicles, the need has always been felt of reducing as much as possible the rolling resistance of the tire.

It is also known that the difficulty of fully satisfying the above need is essentially related to the difficulty of reducing the tire rolling resistance without substantially affecting its performances in terms of kilometric yield, good traction capacity, stability on wet or snow grounds, and good lateral stability.

Until now all the attempts made in the art aiming at reducing the rolling resistance of the tire have brought about a more or less marked worsening of one or more of the above-identified features.

So, for instance, it was recently proposed to form in the blocks located in an equatorial zone of the tread a plurality of slits extending in a direction substantially perpendicular to the rolling direction of the tire.

In such case, however, the desired reduction in rolling resistance was obtained at the expense of the traction characteristics of the tire, which have undergone a corresponding worsening.

Therefore, the technical problem underlying the present invention is to provide a tire having structural and functional features which allow to reduce the tire rolling resistance while keeping the tire performances at a very satisfactory level in terms of kilometric yield, good traction and stability on wet or snow grounds, and good performances of lateral stability.

According to a first aspect of the invention, this problem is solved by a tire of the type indicated above, which is characterised in that the tread further comprises a plurality of transversal grooves, pitchwise spaced from one another and extending parallel to said first slits, said grooves being provided with respective second slits extending from a bottom portion thereof.

According to a second aspect of the invention, this problem is solved by a tread for vehicle tires, in particular a pre-moulded tread for cold-covering worn tires, comprising a plurality of blocks located in opposite sides of the equatorial plane of a tire between a longitudinal groove formed astride said equatorial plane and a couple of longitudinal grooves, said blocks being axially crossed by a plurality of first slits extending in a direction substantially perpendicular to the rolling direction of the tire, which is characterised in that it further comprises a plurality of transversal grooves, pitchwise spaced from one another and extending parallel to said first slits, said grooves being provided with respective second slits extending from a bottom portion thereof.

According to the invention, the Applicant has found in particular that by forming, in an equatorial zone of the tread, transversal grooves provided with slits downwardly extending therefrom, it is advantageously possible to achieve both adequate traction characteristics and the desired lower rolling resistance, essentially associated to the overall lower mobility of the tread blocks under the tire ground-contacting area due to the mutual contact of adjoining blocks caused by a closure of the slits.

In the following description and in the appended claims, the blocks located in the equatorial zone of the tread will be indicated for the sake of simplicity by the term: "equatorial blocks".

Preferably, the equatorial zone of the tread concerned by the transversal grooves provided with slits in their lower part extends astride the equatorial plane of the tire and up to the middle of the longitudinal grooves for a length comprised between 40% and 70% of the axial development of the tire tread.

Still more preferably, such equatorial zone extends astride the equatorial plane of the tire for a length comprised between 50% and 60% of the axial development of the tread.

Thanks to the presence of the slits, the tread portions in which the equatorial blocks are formed, are so-to-say embedded into one another under the ground-contacting area of the tire, because of the strains which the tread undergoes during tire rolling.

The ensuing stiffness increase reduces the energy dissipation phenomena due both to the mobility of the blocks and to the physical-mechanical characteristics of the rubber composition of the tread, with a reduction of rolling resistance during running.

A further and important advantageous effect attained by the particular structure of the transversal grooves is represented by the achievement of a better wear regularity, which is also associated to some extent to the stiffness increase of the tread equatorial blocks.

Preferably, the tread is circumferentially provided with a couple of longitudinal slits extending in opposite parts of the equatorial plane of the tire, which slits axially separate the equatorial blocks and split the transversal grooves formed therein into two portions proximal and, respectively, distal with respect to the equatorial plane of the tire. A depth of the longitudinal slits is substantially equal to a sum of depths of the transversal grooves and the second slits, and a depth of the first slits is substantially equal to a sum of the depths of the transversal grooves and the second slits.

Advantageously, the longitudinal slits contribute both to increase the tire road holding in the axial direction, whenever the same is stressed in a transversal direction with respect to the rolling direction, and to prevent the triggering of phenomena of irregular wear of the blocks.

Preferably, the longitudinal slits extend along substantially the whole circumferential development of the tire according to an essentially zigzag path, which advantageously enhances the embedding between axially adjoining blocks, with a further reduction in energy dissipation phenomena due to block mobility in the longitudinal direction.

In the tire of the invention, the transversal grooves preferably have a reduced depth compared to the tires of the known art, and such as not to exceed 18 mm together with the slits downwardly extending from their bottom.

Such a reduced depth of the grooves allows to achieve several important advantages.

Firstly, it allows to effectively contribute to reduce the rolling resistance of the tire, thanks to the reduction in the volume of the rubber composition required to form the tread and, along therewith, to reduce the hysteretic energy dissipation phenomena induced during rolling.

Secondly, it allows to achieve both a good wear regularity with a substantial absence of the so-called "milling" wear on the block outlet edge, obtained thanks to the limited block flexibility, and a good noiselessness, obtained thanks to the reduction of the equatorial blocks vibration phenomena and to the reduction of the so-called "air pumping" acoustic phenomenon generated by the cyclic compression of the air trapped in the transversal grooves.

In a preferred embodiment, the transversal grooves have a depth ranging between 1 and 4 mm in the portion proximal to the equatorial plane of the tire and a depth ranging between 5 and 10 mm in the portion distal to said equatorial plane.

In this way, an optimal balance is achieved between the traction characteristics and the wear resistance characteristics of the tire tread.

Preferably, the sum of the depths of the transversal grooves and of the slits downwardly extending therefrom has a substantially constant value along the axial development of the same and is comprised between 13 and 18 mm.

In a preferred embodiment of the invention, in the portion of the transversal grooves proximal to the equatorial plane of the tire, the slits downwardly extending from the bottom of the grooves have a depth comprised between 60% and 90% of the sum of the depths of the transversal grooves and said slits.

On the contrary, in the portion of the transversal grooves distal with respect to the equatorial plane of the tire, the slits downwardly extending from the bottom of the grooves have a depth of between 40% and 70% of the sum of the depths of the transversal grooves and said slits.

Thanks to this feature, an optimal embedding effect is ensured between adjoining blocks, whatever the block wear condition is.

In a preferred embodiment, both the transversal grooves and the slits downwardly extending from their bottom extend substantially along the entire axial development of the blocks and have at least a substantially zigzag-shaped portion.

Preferably, the substantially zigzag-shaped portion is located in the portion of transversal grooves and of the slits distal with respect to the equatorial plane of the tire.

In this way, the embedding between tread portions concerned by adjoining equatorial blocks is promoted, with a further reduction of the energy dissipation phenomena due to the mobility of the equatorial blocks and, along therewith, of the tire rolling resistance.

Alternatively, such embedding effect between tread portions concerned by adjoining equatorial blocks can be promoted by forming substantially as a cusp—i.e. by causing an abrupt inclination change with respect to its axial development—at least a portion of the transversal grooves and of the slits downwardly extending therefrom.

Preferably, the substantially cusp-shaped portion is located in the portion of the transversal grooves and of the slits proximal to the equatorial plane of the tire.

According to a preferred embodiment of the invention, the path of the transversal grooves and of the related slits forms a segmented line wherein at least a substantially zigzag-shaped portion and a substantially cusp-shaped portion are both present.

Advantageously, in this way said embedding effect between tread portions concerned by adjoining equatorial blocks is optimised, and the maximum effect of reduction of the tire rolling resistance is achieved.

Preferably, moreover, the transversal grooves and the slits downwardly extending therefrom confer a directional characteristics to the tread pattern, i.e. they impart a preferred rolling direction to the tire.

In any case, the invention may also be implemented according to non-directional (symmetrical or asymmetrical) tread patterns that lack such preferred rolling direction.

Advantageously, the transversal grooves have a width that increases moving away from the equatorial plane of the tire, so as to enhance the tire capacity of draining off the water present under the tire ground-contacting area and reduce the aquaplaning phenomena.

In order to help a progressive entry of the transversal grooves under the ground-contacting area of the tire and to reduce as much as possible its noisiness during running, the transversal grooves advantageously form an angle ($\alpha$) of from 10° to 25° with respect to a plane perpendicular to the equatorial plane of the tire.

Preferably, at least one of the blocks formed in the equatorial zone of the tread has a beveled corner at a longitudinal groove formed astride the equatorial plane of the tire and/or at the longitudinal grooves circumferentially extending in a direction substantially parallel to the tire rolling direction.

In this way, the number of edges that may trigger phenomena of irregular wear, due to their mobility, is advantageously adequately reduced.

In a further preferred embodiment of the invention, the longitudinal grooves exbend substantially along the whole circumferential development of the tire, according to a substantially zigzag-shaped path.

Advantageously, in this way the traction capacity of the tread in the tire rolling direction is further increased.

Preferably, the tire of the invention further comprises a plurality of lateral blocks, having an outer surface provided with facets, formed in opposite side zones of the tread external to said equatorial zone.

Advantageously, the outer faceted surface of said lateral blocks effectively contributes to reach the desired traction characteristics of the tread in the tire rolling direction.

Preferably, at least one of said lateral blocks has a beveled corner at the longitudinal grooves circumferentially extending in a direction substantially parallel to the tire rolling direction and/or at its own outer faceted surface.

In this way, the number of points suitable to trigger an irregular wear of the tire is adequately reduced.

In order to further increase the kilometric yield, the tire of the invention preferably has a high solid/total volume ratio under its ground-contacting area.

In other words, the overall volume taken up by the blocks (equatorial and lateral) i.e. the volume of the solids in a tread portion having a length equal to the pitch of the tread pattern and a width equal to the tread axial development, is preferably comprised between 80% and 85% of the overall volume of said tread portion.

In the following description and in the appended claims, the term: "axial development of the tread", is used to indicate the extension in width of the latter as measured along the peripheral surface of the tire.

In the following description and in the appended claims, the term: "pitch of the tread pattern" is used to indicate the length, measured along the circumferential development of the tread, of a portion of the tread pattern which periodically repeats for a finite number "n" of times throughout the whole circumferential development of the tread.

In the present case, therefore, the pitch of the tread pattern is equal to the distance between the starting points of two subsequent repetitive portions of the tread pattern, measured along the circumferential development of the tread.

Preferably, in the equatorial zone of the tread the volume of the solids, i.e. the volume taken up by the equatorial blocks, is preferably comprised between 80% and 90% of the overall volume of said tread portion, while in the lateral zones the volume taken up by the lateral blocks is slightly lower, in order to improve the traction characteristics and is comprised between 75% and 85% of the overall volume of said tread portion.

The tire and the tread of the invention may be manufactured by means of a process comprising a plurality of production steps which are quite conventional per se and known in the art.

More particularly, such process comprises the steps of preliminarily and independently preparing several semi-finished products corresponding to the different parts of the tire (carcass plies, belt strips, bead wires, fillings, sidewalls and treads), which are successively assembled to one another by means of a suitable assembling machine.

The subsequent vulcanisation step then welds together the above semi-finished products to form an integral block, i.e., the tire.

Clearly, the step of preparing the above semi-finished products is preceded by a step of preparing and forming the corresponding rubber compositions, which comprise at least an unsaturated chain cross-linkable polymer base.

For the purposes of the invention, suitable polymer bases are those selected from among the group comprising: natural rubber, 1,4-cis polybutadiene, polychloroprene, 1,4-cis polyisoprene, optionally halogenated isoprene-isobutene copolymers, either prepared in solution or in emulsion, ethylene-propylene-diene terpolymers.

According to a preferred embodiment of the invention and in order to obtain an optimal kilometric yield, a good grip on wet road and an optimal tear resistance of the tread, the aforementioned polymer bases are used in the rubber composition in such quantities and proportions as to achieve a tread abradability—determined according to Standards DIN 53516—not exceeding 70 mm$^3$.

The determination of the optimal makeup of the rubber composition and its preparation by means of conventional mixing operations, may be easily performed by those skilled in the art.

A typical rubber composition suitable to achieve the optimal abradibility characteristics (in parts by weight) is given hereunder solely by way of non limitative example:

| polymer base | 100 |
| carbon black | 48–57 |
| ZnO | 3–5 |
| stearic acid | 2.5–3.5 |
| antioxidants | 1.5–2.5 |
| anti–fatigue agents | 1.5–2.5 |
| sulphur or donors thereof | 1.2–2.0 |
| accelerants | 0.8–1.6 |

Further characteristics and advantages will be more readily apparent from the following description of a preferred embodiment of a tire according to the invention, given by way of non limitative indication, with reference to the attached drawings.

In the drawings:

FIG. 4 shows a cross-section of the tread of the tire of FIG. 1 taken along line III—III of FIG. 2;

FIGS. 5–9 show respective cross-sections, in enlarged scale, of grooves and slits formed in the tread of the tire of FIG. 1, taken respectively along lines V—V, VI—VI, VII—VII, VIII—VIII and IX—IX of FIG. 2;

FIG. 10 shows a cross-section of the tread of the tire of FIG. 1 taken along line X—X of FIG. 2.

Figure 1:
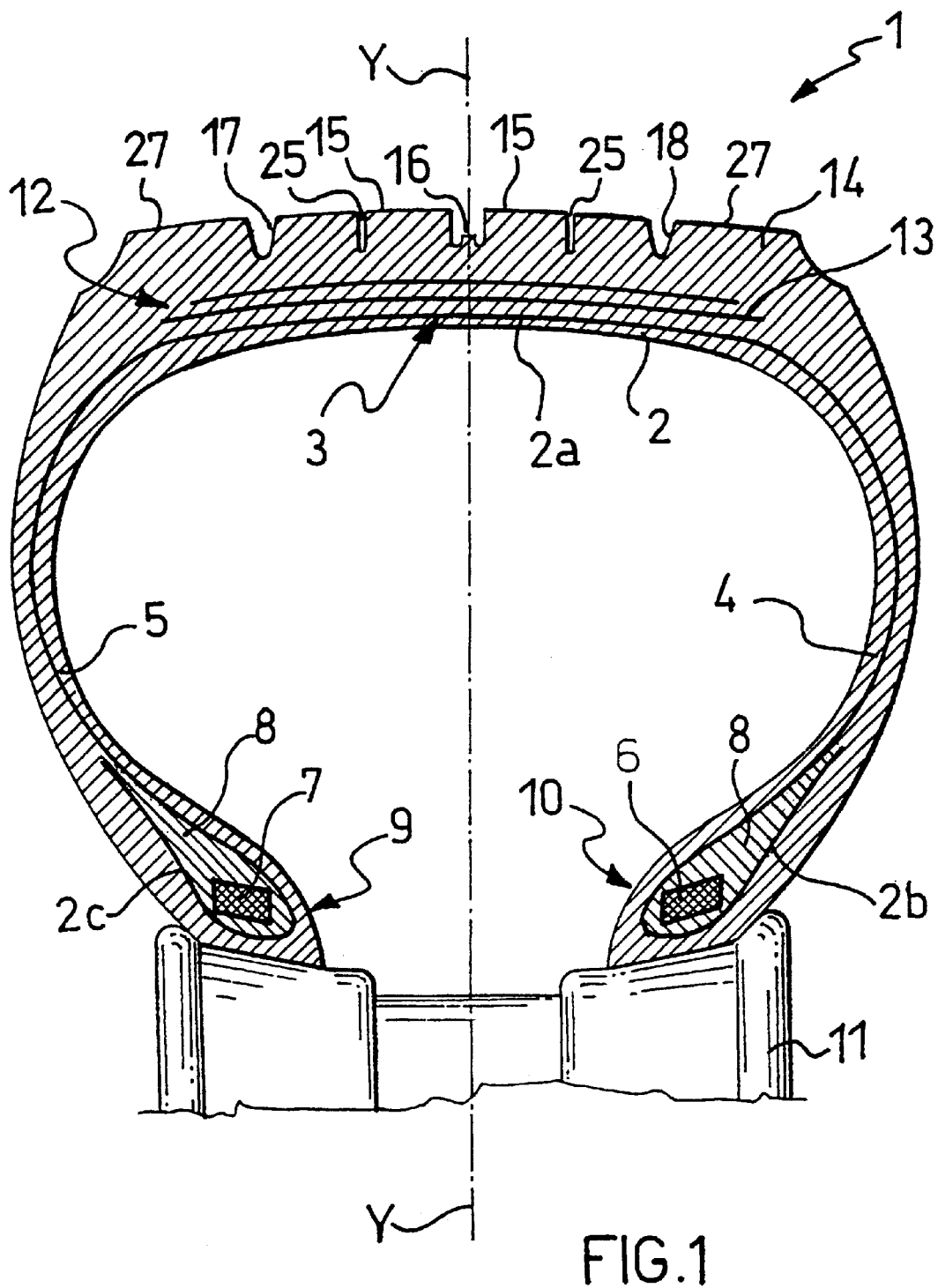
FIG. 1 shows a cross-section view of a tire according to the invention taken along line I—I of FIG. 2.

In the figures, 1 indicates a tire for vehicles according to the invention, in particular a tire suitable for long motorway mileage, and intended for being mounted on the drive wheel of a truck and full trailer or a tractor and semitrailer.

The tire 1 comprises a carcass structure 2 including a central crown portion 3 and two sidewalls 4, 5, said carcass being provided with a reinforcing ply 2a the opposite side edges 2b, 2c of which are bent around respective bead cores 6, 7.

On the outer peripheral edge of the bead cores 6, 7 an elastomeric filling 8 is applied which fills the zone defined between the reinforcing ply 2a and the corresponding side edges 2b, 2c of the reinforcing ply 2a.

As is known, the opposite zones of the tire comprising each of the bead cores 6, 7 and the filling 8 form the so-called beads, globally indicated by 9 and 10, intended for anchoring the tire 1 on a corresponding mounting rim 11 of a vehicle wheel.

A belt structure 12, comprising one or more belt strips 13 obtained from textile or metal cords incorporated in a sheet of rubber composition, is coaxially associated to said carcass structure 2.

In a known way, a tread 14, by means of which the tire 1 gets in touch with the ground, is applied onto the belt structure 12.

The tread 14 comprises a plurality of blocks 15, indicated in the following by the term: equatorial blocks, located on opposite parts of an equatorial plane Y—Y of the tire between a longitudinal groove 16 formed astride said equatorial plane, and a couple of longitudinal grooves 17, 18, circumferentially extending in a direction substantially parallel to the tire rolling direction, indicated by arrow D in FIG. 2.

Advantageously, the longitudinal groove 16 is provided with a rib 32, extending from bottom 33 of the same, intended for preventing tear formation in the rubber composition and for protecting the underlying belt structure 12 (FIG. 5).

Preferably, the longitudinal grooves 17, 18 extend substantially along the whole circumferential development of the tire 1 according to a substantially zigzag-shaped path.

In this way, the traction capacity of the tread 14 in the tire rolling direction D is advantageously further increased.

The equatorial blocks 15 are circumferentially separated by a plurality of slits 19 extending in a direction substantially perpendicular to the rolling direction D of tire 1.

In a preferred embodiment, the equatorial zone E of the tread concerned by blocks 15 extends astride the equatorial plane Y—Y of tire 1 for a width of from 50% to 60% of the axial development of the tread.

Still more preferably, the equatorial zone E extends astride the equatorial plane of the tire Y—Y for a width equal to about 55% of the axial development of the tread 14.

The tread 14 further comprises a plurality of transversal grooves 20, pitchwise spaced from one another and extending parallel to slits 19 in a direction substantially perpendicular to the rolling direction D of the tire.

Each of the transversal grooves 20 comprises in turn a bottom 21 connected to opposite inlet and, respectively, outlet sidewalls 22, 23 having a predetermined inclination with respect to the axis of the same groove (FIGS. 6 and 9).

In the following description and in the appended claims, the terms: "inlet" and "outlet" are used to indicate—with reference to the structural features of the transversal grooves 20—the parts of the grooves which are stressed first or get in touch first with the ground during rolling of the tire 1 and, respectively, the parts of the grooves 20 that are stressed after a predetermined angular rotation of the wheel.

In the same way, in the following description and in the appended claims, the terms: "upstream" and "downstream" are used to indicate—with reference to the position of the transversal grooves 20—those parts of the tread 14, for instance the rubber blocks 15, that are stressed or get in touch with the ground during rolling of the tire 1 before and, respectively, after said grooves 20.

According to the invention, the grooves 20 are provided in their lower part with respective slits 24 downwardly extending from the bottom 21 of the same.

Preferably, the tread 14 is circumferentially provided with a couple of longitudinal slits 25 that extend in opposite parts of the equatorial plane Y—Y of the tire 1.

Figure 2:
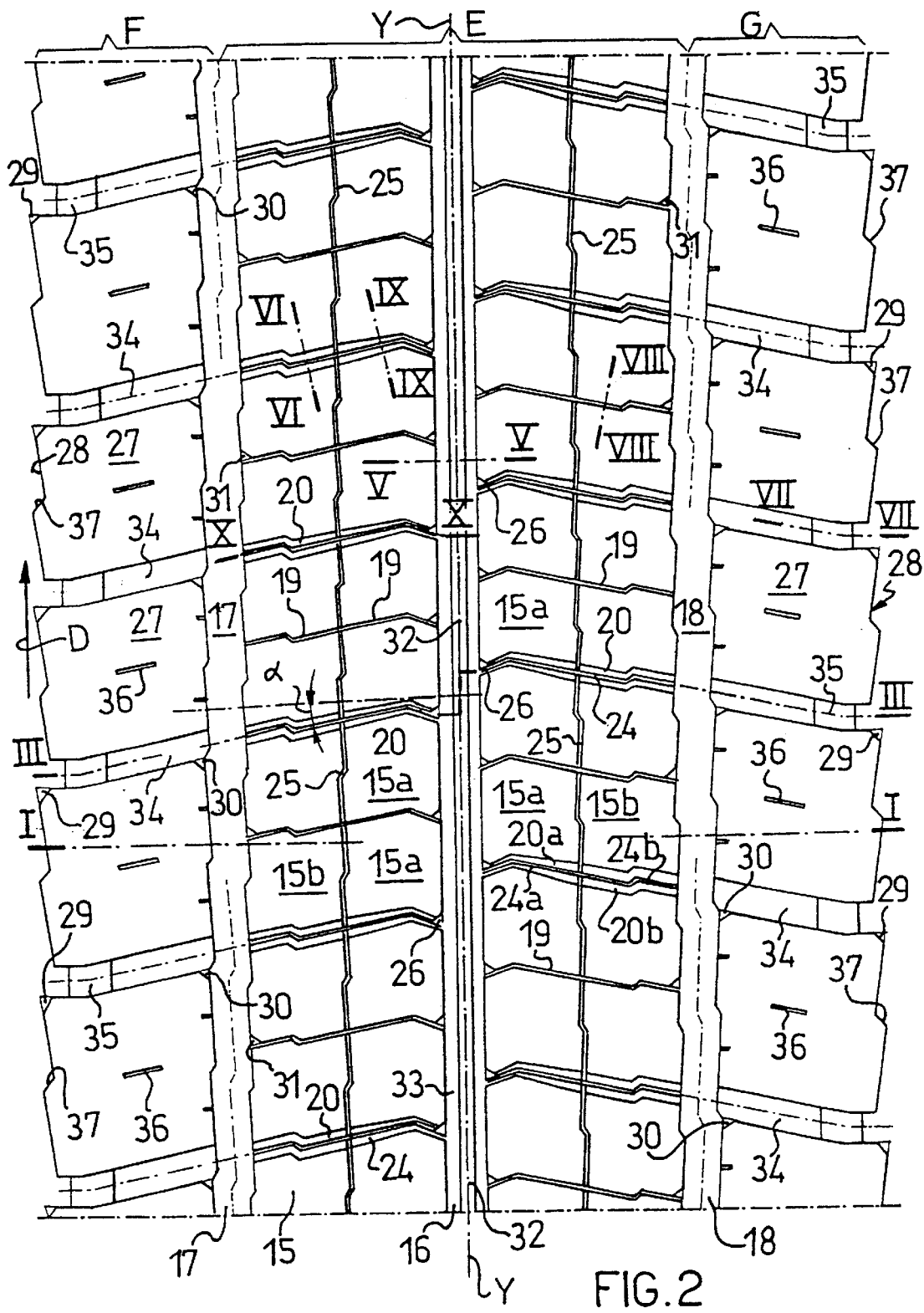
FIG. 2 shows a plan development of a tread portion of a tire according to the invention.
Figure 3:
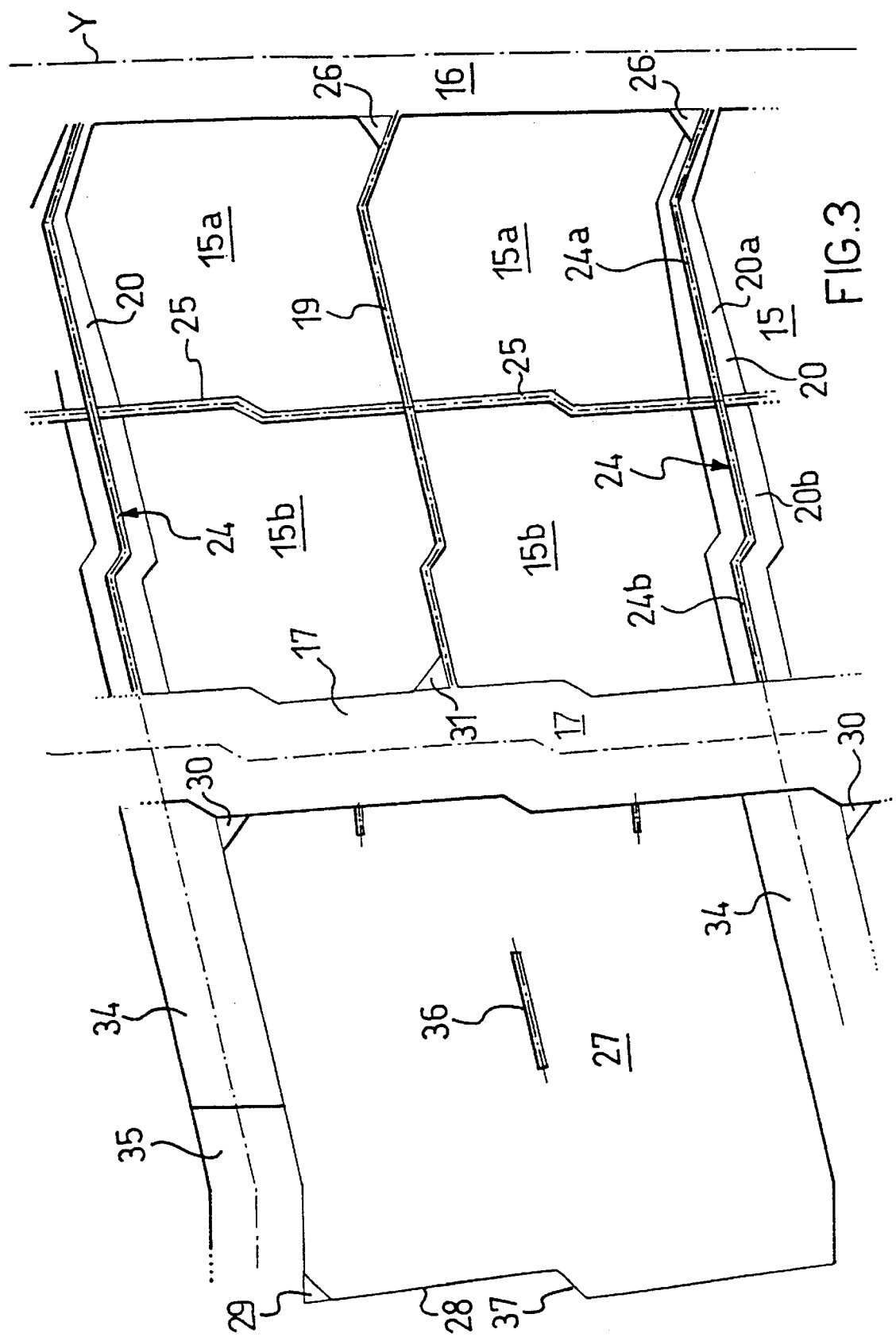
FIG. 3 shows some details, in enlarged scale, of a tread portion of a tire according to the invention.

The longitudinal slits 25 split the equatorial blocks 15 in the axial direction, splitting them into two groups of proximal blocks 15a and, respectively, distal blocks 15b with respect to the equatorial plane Y—Y of the tire (FIG. 2).

In the same way, the longitudinal slits 25 axially split the transversal grooves 20 and the slits 24, downwardly extending from the same, into two portions respectively proximal 20a, 24a, and distal 20b, 24b with respect to the equatorial plane Y—Y of the tire (FIG. 4).

Advantageously, the longitudinal slits 25 contribute both to increase the road holding in the axial direction of the tread whenever tire 1 is stressed in a transversal direction with respect to the rolling direction D and to avoid the triggering of irregular wear phenomena of the equatorial blocks 15.

Preferably, the longitudinal slits 25 extend substantially along the whole circumferential development of the tire 1 according to a substantially zigzag-shaped path which advantageously enhances the embedding between axially adjoining portions of the equatorial grooves 15, with a further reduction of the energy dissipation phenomena during rolling of the tire 1.

In order to achieve an optimal balance between low rolling resistance, good traction capacity, good wear regularity and reduced noisiness, the transversal grooves 20 preferably have a depth not exceeding 18 mm.

Still more preferably, the transversal grooves 20 have a depth of from 1 to 4 mm in the portion 15a of the blocks proximal to the equatorial plane Y—Y of tire 1, and a depth of from 5 to 10 mm in the portion 15b of the blocks distal with respect to the equatorial plane Y—Y.

In this way, an optimal compromise is reached between traction and wear resistance characteristics of the tire.

Preferably, the sum of the depths of the transversal grooves 20 and of the slits 24 downwardly extending therefrom, takes on a substantially constant value along their axial development and is comprised between 13 and 18 mm.

Thanks to this feature, an optimal embedding effect is achieved between the portions of the tread 14 in which adjoining equatorial blocks 15 are formed, whatever the wear conditions of said blocks are.

In a preferred embodiment of the invention, in the portion 20a of the transversal grooves 20 proximal to the equatorial plane Y—Y of the tire 1, the slits 24 downwardly extending from bottom 21 of said grooves have a depth of from 60% to 90% of the sum of the depths of the transversal grooves 20 and of the slits 24.

On the contrary, in the portion 20b of the transversal grooves 20 distal with respect to the equatorial plane Y—Y of tire 1, the slits 24 downwardly extending from bottom 21 of said grooves have a depth of from 40% to 70% of the sum of the depths of the transversal grooves 20 and of the slits 24.

In a preferred embodiment, both the transversal grooves 20 and the slits 24 downwardly extending from bottom 21 of said grooves extend substantially along the whole development of the equatorial blocks 15a, 15b, according to a path forming a segmented line wherein at least a substantially zigzag-shaped portion and at least a substantially cusp-shaped portion are present.

Preferably, the substantially zigzag-shaped portion is located in portions 20b, 24b of the transversal grooves 20 and of the slits 24 distal with respect to the equatorial plane Y—Y of the tire 1.

Preferably, the substantially cusp-shaped portion is located in portions 20a, 24a of the transversal grooves 20 and of the slits 24 proximal with respect to the equatorial plane Y—Y of the tire 1.

Advantageously, in this way the embedding effect between portions of tread 14 concerned by adjoining equatorial blocks 15 is optimised, and the maximum effect of reduction of the energy dissipation phenomena—and therefore of rolling resistance of the tire 1—is achieved.

Advantageously, the transversal grooves 20 have a width that increases moving away from the equatorial plane Y—Y of the tire 1, so as to enhance the tire capacity of draining off the water present under the tire ground-contacting area and reduce the aquaplaning phenomena.

Preferably, the width of the transversal grooves 20 ranges from a minimum of 2 mm near the longitudinal groove 16 to a maximum of 10 mm near the opposite longitudinal grooves 17 and 18.

In order to facilitate a progressive entry of the transversal grooves 20 under the tire ground-contacting area and to reduce as much as possible the noisiness of the tire during rolling, the transversal grooves 20 advantageously form an angle (α) of between 10° and 25° with respect to a plane perpendicular to the equatorial plane Y—Y of the tire 1.

Preferably, at least one of the blocks 15a formed in the equatorial zone E of the tread 14 and proximal with respect to the equatorial plane Y—Y of the tire 1, has a beveled corner 26 near the longitudinal groove 16.

Still more preferably, at least one of the blocks 15b formed in the equatorial zone E of the tread 14 and distal with respect to the equatorial plane Y—Y of the tire 1, has a beveled corner 31 near the longitudinal grooves 17, 18 circumferentially extending in a direction substantially parallel to the rolling direction D of the tire.

Advantageously, in this way an adequate reduction in the number of edges which, due to their mobility, may trigger irregular wear phenomena is obtained.

Preferably, the tire of the invention further comprises a plurality of lateral blocks 27 defined in opposite side zones F, G of the tread 14, external to the equatorial zone E of the same.

The lateral blocks 27 are longitudinally separated by a corresponding plurality of transversal grooves 34, extending between the longitudinal grooves 17 and 18 and opposite shoulder portions of the tread 14.

Preferably, the transversal grooves 34 have a constant width comprised between 7 and 12 mm.

The lateral blocks 27 are also mutually connected and stiffened by a plurality of ribs 35 intended for increasing stiffness of the tread 14 at its own shoulder portions.

Conveniently, each of the lateral blocks 27 is centrally provided with a transversal slit 36 the function of which is to increase the traction capacity of the tread 14 at the side zones F, G thereof.

To this aim, the axial development of the slit 36 may be limited to 10–15 mm as shown in the figures, or may extend up to cover to whole width of the lateral blocks 27.

Advantageously, the lateral blocks 27 are provided with an outer surface 28 provided with facets 37, which effectively contributes to achieve the desired traction capacity of the tread 14 in the rolling direction D of the tire 1.

Preferably, at least one of lateral blocks 27 has a beveled corner 29 near its outer faceted surface 28.

Still more preferably, at least one of the lateral blocks 27 has a beveled corner 30 near the longitudinal grooves 17, 18, circumferentially extending in a direction substantially parallel to the rolling direction D of the tire 1.

In this way, the points that might trigger an irregular wear of the tire 1 are adequately reduced.

According to a preferred feature of the invention, the volume taken up by the equatorial blocks 15, or volume of the solids, in a tread portion having a length equal to pitch "p" of the tread pattern, and a width equal to the axial development of the tread 14, is comprised between 80% and 90% of the overall volume of such tread portion.

Preferably, furthermore, the volume taken up by the lateral blocks 27 in this same portion of the tread 14 is comprised between 75% and 85% of the overall volume of the same.

Hence, on the whole the total volume of the solids (equatorial blocks 15 and lateral blocks 27) in the aforesaid portion of the tread 14 is comprised between 80% and 85% of the overall volume of the same.

Repeated tests carried out by the Applicant have shown that the tires according to the invention fully solve the problem of reducing rolling resistance while achieving optimal values of tire performance in terms of kilometric yield, wear regularity, good traction capacity and grip on wet or snow grounds, good lateral stability and low noisiness.

Obviously, those skilled in the art may introduce modifications and variants in the above described invention, in order to satisfy specific and contingent application requirements, modifications and variants which fall anyhow within the scope of protection as is defined in the appended claims.

What is claimed is:
1. A tire for vehicles, comprising:
   a carcass structure including a central crown portion and two sidewalls ending into a couple of beads for anchoring to a rim of a wheel;
   a belt structure coaxially associated to the carcass structure; and
   a tread coaxially extending around the belt structure, comprising a plurality of blocks located on opposite sides of an equatorial plane of the tire between a longitudinal groove formed astride the equatorial plane of the tire and two additional longitudinal grooves, the blocks being circumferentially spaced by a plurality of first slits extending in a direction substantially perpendicular to a rolling direction of the tire;
   wherein the tread further comprises a plurality of transversal grooves, pitchwise spaced from one another and extending parallel to and between the first slits, the transversal grooves being provided with second slits extending from a bottom portion thereof,
   wherein the transversal grooves comprise a first portion and a second portion,
   wherein the first portion is proximal to the equatorial plane of the tire and the second portion is distal with respect to the equatorial plane of the tire, and
   wherein a depth of the distal portion is greater than a depth of the proximal portion.

2. The tire of claim 1, wherein a sum of depths of the transversal grooves and the second slits does not exceed 18 mm.

3. The tire of claim 1, wherein the transversal grooves have a depth comprised between 1 mm and 4 mm in the first portion proximal to the equatorial plane of the tire.

4. The tire of claim 1, wherein the transversal grooves have a depth comprised between 5 mm and 10 mm in the second portion distal with respect to the equatorial plane of the tire.

5. The tire of claim 1, wherein the transversal grooves have a width that increases in a direction away from the equatorial plane of the tire.

6. The tire of claim 1, wherein the transversal grooves and the second slits comprise at least a substantially zigzag-shaped portion.

7. The tire of claim 6, wherein the substantially zigzag-shaped portion is located in the distal portion of the transversal grooves and in a portion of the second slits distal with respect to the equatorial plane of the tire.

8. The tire of claim 1, wherein the transversal grooves and the second slits comprise at least a substantially cusp-shaped portion.

9. The tire of claim 8, wherein the substantially cusp-shaped portion is located in the proximal portion of the transversal grooves and in a portion of the second slits proximal to the equatorial plane of the tire.

10. The tire of claim 1, wherein the transversal grooves form an angle comprised between 10° and 25° with respect to a plane perpendicular to the equatorial plane of the tire.

11. The tire of claim 1, wherein the tread further comprises a plurality of longitudinal slits circumferentially extending on opposite sides of the equatorial plane of the tire.

12. The tire of claim 11, wherein the longitudinal slits extend substantially along an entire circumferential development of the tire according to a substantially zigzag-shaped path.

13. The tire of claim 1, wherein at least one of the blocks has a beveled corner at the longitudinal groove formed astride the equatorial plane of the tire.

14. The tire of claim 1, wherein at least one of the blocks has a beveled corner at one of the additional longitudinal grooves.

15. The tire of claim 1, wherein the additional longitudinal grooves extend substantially along an entire circumferential development of the tire according to a substantially zigzag-shaped path.

16. The tire of claim 1, further comprising a plurality of lateral blocks having an outer surface provided with facets at opposite side zones of the tread.

17. The tire of claim 16, wherein at least one of the lateral blocks has a beveled corner at one of the additional longitudinal grooves.

18. The tire of claim 16, wherein at least one of the lateral blocks has a beveled corner at the outer surface.

19. The tire of claim 1 or 16, wherein a volume taken up by the blocks in a portion of the tread having a length equal to a pitch of a pattern of the tread and a width equal to an axial development of the tread is comprised between 80% and 85% of an overall volume of the portion of the tread.

20. A tread for a vehicle tire comprising a plurality of blocks located on opposite sides of an equatorial plane of the tire between a longitudinal groove formed astride the equatorial plane of the tire and two additional longitudinal grooves, the blocks being axially crossed by a plurality of first slits extending in a direction substantially perpendicular to a rolling direction of the tire, further comprising a plurality of transversal grooves, pitchwise spaced from one another and extending parallel to and between the first slits, the transversal grooves being provided with second slits extending from a bottom portion thereof, wherein the transversal grooves comprise a first portion and a second portion, wherein the first portion is proximal to the equatorial plane of the tire and the second portion is distal with respect to the equatorial plane of the tire, and wherein a depth of the distal portion is greater than a depth of the proximal portion.

21. The tread of claim 20, wherein a sum of depths of the transversal grooves and the second slits does not exceed 18 mm.

22. The tread of claim 20, wherein the transversal grooves have a depth comprised between 1 mm and 4 mm in the first portion proximal to the equatorial plane of the tire.

23. The tread of claim 20, wherein the transversal grooves have a depth comprised between 5 mm and 10 mm in the second portion distal with respect to the equatorial plane of the tire.

24. The tread of claim 20, wherein the transversal grooves have a width that increases in a direction away from the equatorial plane of the tire.

25. The tread of claim 20, wherein the transversal grooves and the second slits comprise at least a substantially zigzag-shaped portion.

26. The tread of claim 25, wherein the substantially zigzag-shaped portion is located in the distal portion of the transversal grooves and in a portion of the second slits distal with respect to the equatorial plane of the tire.

27. The tread of claim 20, wherein the transversal grooves and the second slits comprise at least a substantially cusp-shaped portion.

28. The tread of claim 27, wherein the substantially cusp-shaped portion is located in the proximal portion of the transversal grooves and in a portion of the second slits proximal to the equatorial plane of the tire.

29. The tread of claim 20, wherein the transversal grooves form an angle comprised between 10° and 25° with respect to a plane perpendicular to the equatorial plane of the tire.

30. The tread of claim 20, further comprising a plurality of longitudinal slits circumferentially extending on opposite sides of the equatorial plane of the tire.

31. The tread of claim 30, wherein the longitudinal slits extend substantially along an entire circumferential development of the tire according to a substantially zigzag-shaped path.

32. The tread of claim 20, wherein at least one of the blocks has a beveled corner at the longitudinal groove formed astride the equatorial plane of the tire.

33. The tread of claim 20, wherein at least one of the blocks has a beveled corner at one of the additional longitudinal grooves.

34. The tread of claim 20, wherein the additional longitudinal grooves extend substantially along an entire circumferential development of the tire according to a substantially zigzag-shaped path.

35. The tread of claim 20, further comprising a plurality of lateral blocks having an outer surface provided with facets at opposite side zones of the tread.

36. The tread of claim 35, wherein at least one of the lateral blocks has a beveled corner at one of the additional longitudinal grooves.

37. The tread of claim 35, wherein at least one of the lateral blocks has a beveled corner at the outer surface.

38. The tread of claim 20 or 35, wherein a volume taken up by the blocks in a portion of the tread having a length equal to a pitch of a pattern of the tread and a width equal to an axial development of the tread is comprised between 80% and 85% of an overall volume of the portion of the tread.

39. A tire for vehicles, comprising:

a carcass structure including a central crown portion, a pair of axially-opposite sidewalls, and a pair of beads for anchoring the tire to a wheel rim;

a belt structure coaxially associated to the carcass structure; and a tread coaxially extending around the belt structure;

wherein the tread comprises:

a plurality of blocks located on opposite sides of an equatorial plane of the tire between a longitudinal groove formed astride the equatorial plane of the tire and two additional longitudinal grooves; and a plurality of longitudinal slits circumferentially extending along the tread at opposite sides of the equatorial plane of the tire;

wherein the blocks are crossed by a plurality of first slits and a plurality of transversal grooves, both extending in a direction substantially perpendicular to a rolling direction of the tire, wherein the plurality of transversal grooves are pitchwise spaced apart from one another, wherein the transversal grooves are provided with second slits extending from a bottom portion of the transversal grooves, wherein a depth of the longitudinal slits is substantially equal to a sum of depths of the transversal grooves and the second slits, and wherein a depth of the first slits is substantially equal to a sum of the depths of the transversal grooves and the second slits.

40. The tire of claim 39, wherein the sum of depths of the transversal grooves and the second slits does not exceed 18 mm.

41. The tire of claim 39, wherein the transversal grooves have a depth comprised between 1 mm and 4 mm in a first portion proximal to the equatorial plane of the tire.

42. The tire of claim 39, wherein the transversal grooves have a depth comprised between 5 mm and 10 mm in a second portion distal with respect to the equatorial plane of the tire.

43. The tire of claim 39, wherein the transversal grooves have a width that increases in a direction away from the equatorial plane of the tire.

44. The tire of claim 39, wherein the transversal grooves and the second slits comprise at least a substantially zigzag-shaped portion.

45. The tire of claim 44, wherein the substantially zigzag-shaped portion is located in a portion of the transversal grooves and of the second slits distal with respect to the equatorial plane of the tire.

46. The tire of claim 39, wherein the transversal grooves and the second slits comprise at least a substantially cusp-shaped portion.

47. The tire of claim 46, wherein the substantially cusp-shaped portion is located in a portion of the transversal grooves and of the second slits proximal to the equatorial plane of the tire.

48. The tire of claim 39, wherein the transversal grooves form an angle comprised between 10° and 25° with respect to a plane perpendicular to the equatorial plane of the tire.

49. The tire of claim 39, wherein at least one of the blocks has a beveled corner at the longitudinal groove formed astride the equatorial plane of the tire.

50. The tire of claim 39, wherein at least one of the blocks has a beveled corner at one of the additional grooves.

51. The tire of claim 39, wherein the additional longitudinal grooves extend substantially along an entire circumferential development of the tire according to a substantially zigzag-shaped path.

52. The tire of claim 39, further comprising a plurality of lateral blocks having an outer surface provided with facets at opposite side zones of the tread.

53. The tire of claim 52, wherein at least one of the lateral blocks has a beveled corner at one of the additional longitudinal grooves.

54. The tire of claim 52, wherein at least one of the lateral blocks has a beveled corner at the outer surface.

55. The tire of claims 39 or 52, wherein a volume taken up by the blocks in a portion of the tread having a length equal to a pitch of a pattern of the tread and a width equal to an axial development of the tread is comprised between 80% and 85% of an overall volume of the portion of the tread.

56. A tread for vehicle tires, comprising:
a plurality of blocks located on opposite sides of an equatorial plane of the tire between a longitudinal groove formed astride the equatorial plane of the tire and two additional longitudinal grooves; and
a plurality of longitudinal slits circumferentially extending along the tread at opposite sides of the equatorial plane of the tire;
wherein the blocks are crossed by a plurality of first slits and a plurality of transversal grooves, both extending in a direction substantially perpendicular to a rolling direction of the tire, wherein the plurality of transversal grooves are pitchwise spaced apart from one another, wherein the transversal grooves are provided with second slits extending from a bottom portion of the transversal grooves, wherein a depth of the longitudinal slits is substantially equal to a sum of depths of the transversal grooves and the second slits, and wherein a depth of the first slits is substantially equal to a sum of the depths of the transversal grooves and the second slits.

57. The tread of claim 56, wherein the sum of depths of the transversal grooves and the second slits does not exceed 18 mm.

58. The tread of claim 56, wherein the transversal grooves have a depth comprised between 1 mm and 4 mm in a first portion proximal to the equatorial plane of the tire.

59. The tread of claim 56, wherein the transversal grooves have a depth comprised between 5 mm and 10 mm in a second portion distal with respect to the equatorial plane of the tire.

60. The tread of claim 56, wherein the transversal grooves have a width that increases in a direction away from the equatorial plane of the tire.

61. The tread of claim 56, wherein the transversal grooves and the second slits comprise at least a substantially zigzag-shaped portion.

62. The tread of claim 61, wherein the substantially zigzag-shaped portion is located in a portion of the transversal grooves and of the second slits distal with respect to the equatorial plane of the tire.

63. The tread of claim 56, wherein the transversal grooves and the second slits comprise at least a substantially cusp-shaped portion.

64. The tread of claim 63, wherein the substantially cusp-shaped portion is located in a portion of the transversal grooves and of the second slits proximal to the equatorial plane of the tire.

65. The tread of claim 56, wherein the transversal grooves form an angle comprised between 10° and 25° with respect to a plane perpendicular to the equatorial plane of the tire.

66. The tread of claim 56, wherein at least one of the blocks has a beveled corner at the longitudinal groove formed astride the equatorial plane of the tire.

67. The tread of claim 56, wherein at least one of the blocks has a beveled corner at one of the additional longitudinal grooves.

68. The tread of claim 56, wherein the additional longitudinal grooves extend substantially along an entire circumferential development of the tire according to a substantially zigzag-shaped path.

69. The tread of claim 56, further comprising a plurality of lateral blocks having an outer surface provided with facets at opposite side zones of the tread.

70. The tread of claim 69, wherein at least one of the lateral blocks has a beveled corner at one of the additional longitudinal grooves.

71. The tread of claim 69, wherein at least one of the lateral blocks has a beveled corner at the outer surface.

72. The tread of claims 56 or 69, wherein a volume taken up by the blocks in a portion of the tread having a length equal to a pitch of a pattern of the tread and a width equal to an axial development of the tread is comprised between 80% and 85% of an overall volume of the portion of the tread.

* * * * *